March 26, 1963     E. F. SCHMITZ     3,082,699

MINIATURE VEHICLE AND CONTROL SYSTEM THEREFOR

Filed Sept. 16, 1959     3 Sheets-Sheet 1

INVENTOR.
Earl F. Schmitz
BY
McGrew and Edwards
ATTORNEYS

March 26, 1963 E. F. SCHMITZ 3,082,699
MINIATURE VEHICLE AND CONTROL SYSTEM THEREFOR
Filed Sept. 16, 1959 3 Sheets-Sheet 2

INVENTOR.
Earl F. Schmitz
BY
ATTORNEYS

March 26, 1963  E. F. SCHMITZ  3,082,699
MINIATURE VEHICLE AND CONTROL SYSTEM THEREFOR
Filed Sept. 16, 1959  3 Sheets-Sheet 3

INVENTOR.
Earl F. Schmitz
BY
ATTORNEYS

United States Patent Office 3,082,699
Patented Mar. 26, 1963

3,082,699
MINIATURE VEHICLE AND CONTROL
SYSTEM THEREFOR
Earl F. Schmitz, 4275 S. Pennsylvania St.,
Englewood, Colo.
Filed Sept. 16, 1959, Ser. No. 840,276
8 Claims. (Cl. 104—247)

This invention relates to miniature vehicles and control systems therefor, particularly of the type used in amusement parks and the like.

Miniature vehicles of the captive type are operated in many amusement parks where the vehicle is moved at a controlled speed under continuance guidance as a safety measure. Steering wheels are provided in most vehicles of this type but do not contribute to the actual guidance of the vehicle. In addition, simulated foot throttles may be provided, but the power system will be controlled in such a way that the operator does not influence or direct the rate of movement of the vehicle.

The present invention represents a departure from such practices by having a guidance system permitting limited independent control by the occupant of the vehicle so arranged as to be automatically guided at the limits of the range of independent movement thereby to maintain the vehicle as a substantially captive vehicle moving along a prescribed course under apparent independent guidance. Provision also is made for acceleration and deceleration along portions of the course by automatic throttle adjustment of a novel character.

It is an object of my invention to provide a simple, durable and economical control system for guiding miniature vehicles over a prescribed course at variable speeds in such manner that the vehicle seems and appears to be under the independent control of the vehicle occupant.

Another object of my invention is to provide a simple, economical and efficient system for variably controlling the rate of movement of a miniature vehicle over a prescribed or established course.

A further object of my invention is to provide a simple, economical and efficient system for automatic guidance of a miniature vehicle whenever its independent operator control directs it beyond the prescribed range of its independent guidance, or becomes inactive.

Other objects reside in novel details of construction and novel combinations and arrangements of parts, all of which will be set forth in the course of the following description.

The practice of my invention will be best understood by reference to the accompanying drawings. In the drawings, in the several views of which like parts bear similar reference, FIG. 1 is an isometric view, illustrating an arrangement of miniature vehicles at a loading and unloading station along a track, with a portion of the guidance member shown as mounted at varying elevations above the track;

Figure 1:
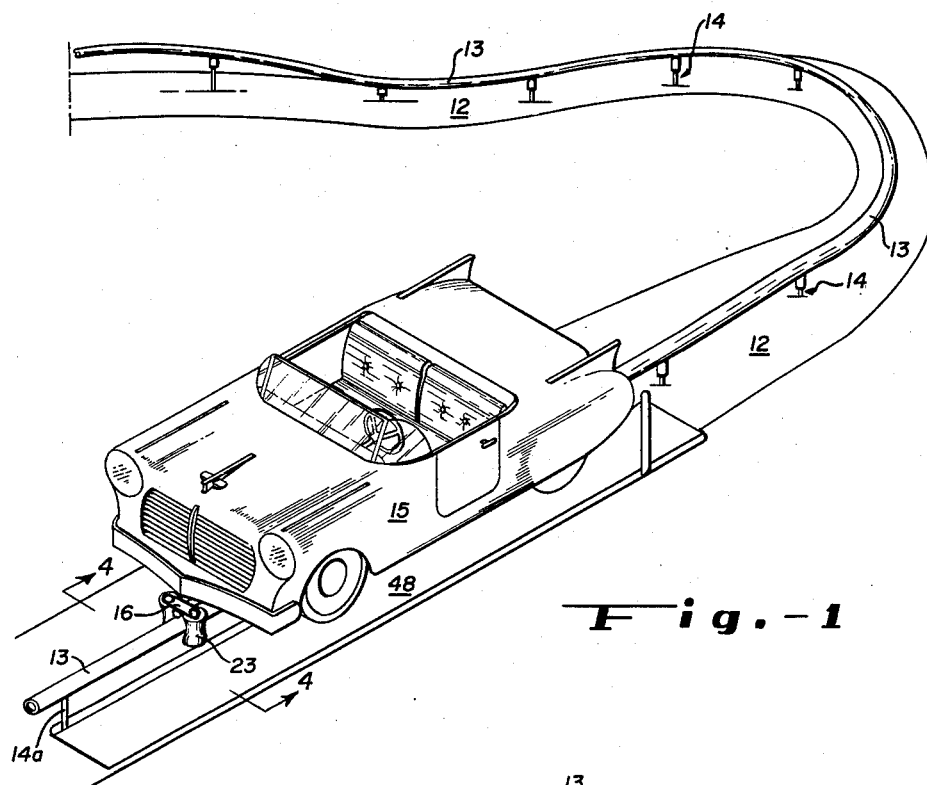

As shown in FIG. 1, a system according to the present invention may include a closed track or course 12, preferably concrete or pavement, and a guidance member 13 is mounted on a plurality of upright supports 14 located at suitable intervals along the track. The guidance member preferably comprises sections of pipe suitably joined and disposed at various elevations above the track due to varying elevations of the points of support so as to control the rate of movement of a vehicle, such as the miniature automobile 15, in a manner which will be set forth hereinafter. A slidable contact unit 16 supported forwardly from the vehicle 15 engages the guidance member 13 at all times during movement of the vehicle around the course, so that it functions as a captive vehicle, although provided with a range of independent steering control from the driver's seat permitting the occupant to attain the feeling of actual operation.

Figure 2:
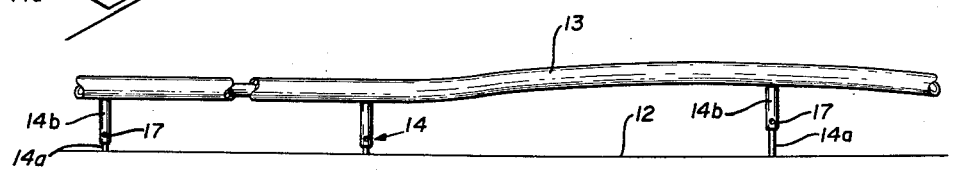
FIG. 2 is a fragmentary side elevation of a portion of the guidance member, of FIG. 1, drawn to an enlarged scale and partially broken to illustrate a preferred arrangement for joining sections.
Figure 3:
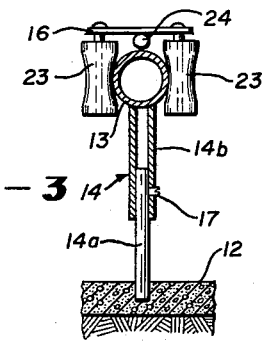
FIG. 3 is a vertical section through one of the supports for the guidance member with the slidable contact means of the steering control system shown in place on said member.

A preferred arrangement for mounting the guidance member 13 has been illustrated in FIGS. 2 and 3. As shown, the upright supports 14 comprise a two part assembly, including a lower post member 14a embedded in the concrete of track 12 (except when the lower end of post 14a is mounted on rod 50, in which case it is welded rather than embedded in concrete) and an adjustable sleeve portion 14b which is secured to guidance member 13 by welding and is initially positioned at a selected elevation on post 14a and held in such position by a set screw 17. When an advancing vehicle meets an upgrade in guidance member 13 the speed of vehicle 15 is increased, and when the vehicle 15 meets a downgrade of member 13, the decreased elevation thereof reduces the speed of the vehicle, with provision for a full stop at a point of maximum decrease.

Figure 5:
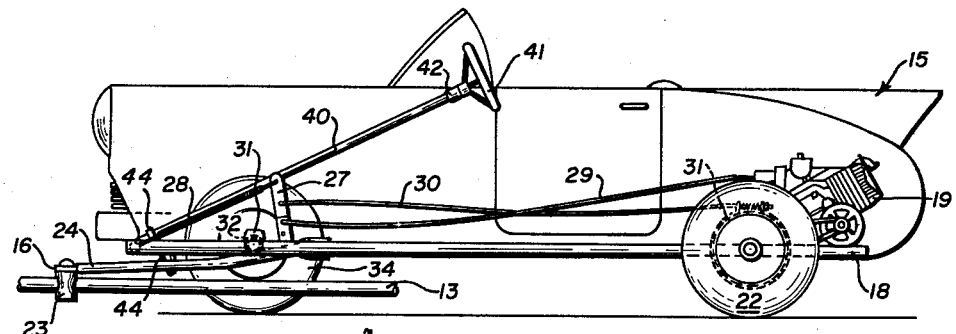
FIG. 5 is a side elevation of the vehicle chassis, illustrating a preferred type of prime mover in relation to the operating controls for steering, speed, and braking, with the body position indicated by dash lines.
Figure 6:
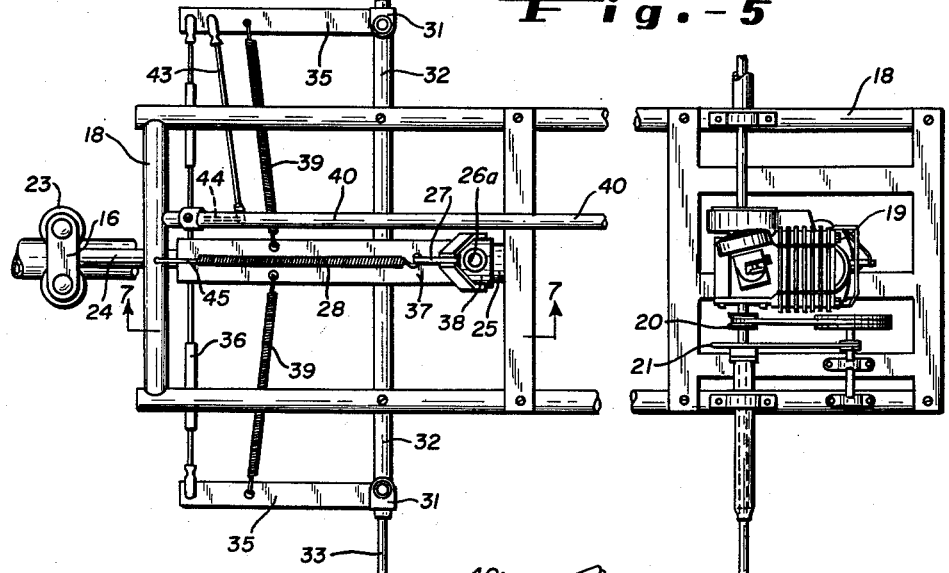
FIG. 6 is a fragmentary top plan view of the assembly shown in FIG. 5, drawn to an enlarged scale.
Figure 7:
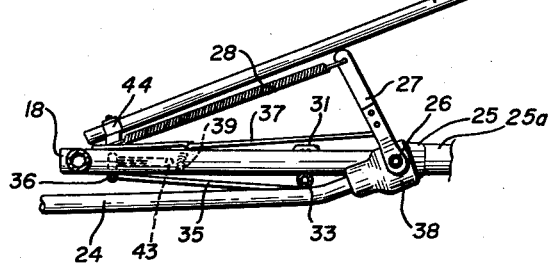
FIG. 7 is a section taken along the line 7—7, FIG. 6.
Figure 8:
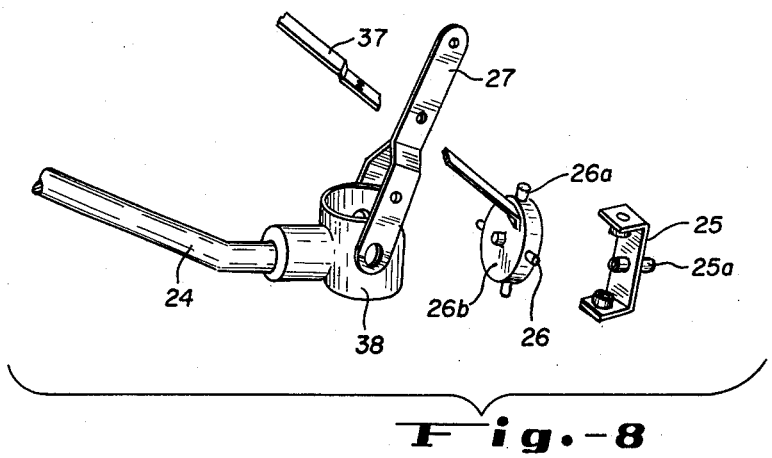
FIG. 8 is an exploded perspective view of a portion of the elements of FIGS. 6 and 7.
Figure 9:
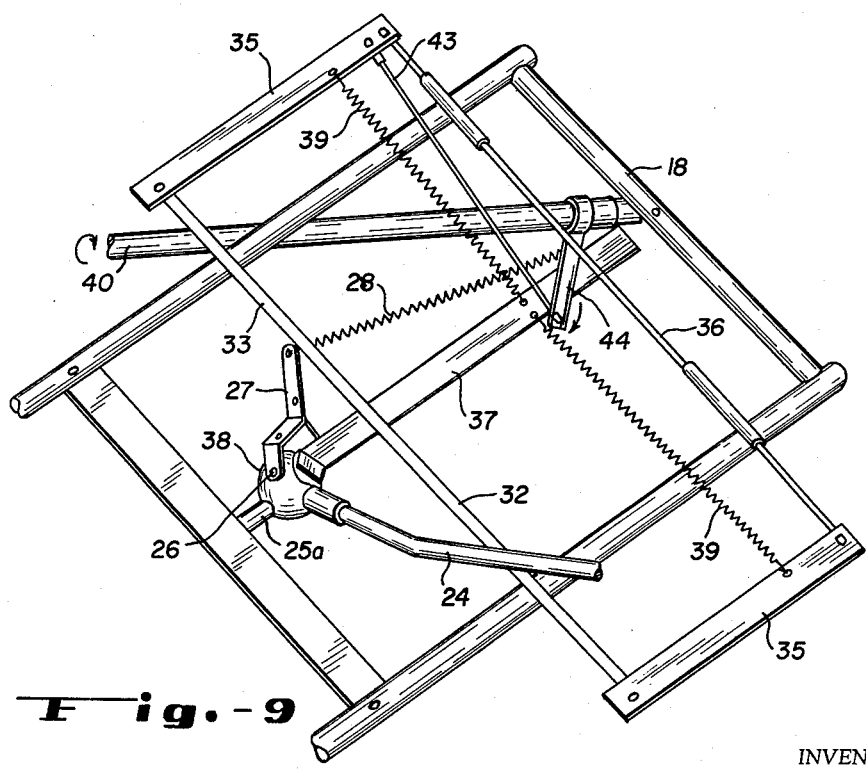
FIG. 9 is a perspective view from the bottom of a forward portion of the elements of FIG. 6 in order to more clearly show the relationship between parts.

The operating and control mechanism of vehicle 15 is illustrated in FIGS. 5, 6 and 7. The chassis or frame 18 of the vehicle supports a prime mover, here shown as an internal combustion engine 19 mounted at the rear of the vehicle with a centrifugal clutch 20 and chain transmission 21. Engaging and disengaging the clutch 20 through its related parts provides selective drive for the rear wheels 22 of the vehicle. The contact means 16 at the forward end of the vehicle carries a pair of rollers 23 engaging the sides of guidance member 13 and an arm 24 extends rearwardly from contact means 16 and is connected to a block 25 permitting horizontal swinging movement in following the bends of the guidance member. Block 25 includes a rearwardly extending portion 25a which is welded or otherwise fixed to an adjacent portion of the vehicle chassis. Bearings 26 permit rocking movement of arm 24 in accordance with the rise and fall of the guidance member 13. Similarly, bearings 26a permit sidewise or horizontal swinging of arm 24 in accordance with the movement of guidance member 13. Thus, fixed block 25 and movable member 38 coact in a universal joint-like action. Member 26b (see FIG. 8) serves as a support for the bearings 26 and 26a.

A lever or first arm 27 mounted and fixed to member 38 is movable therewith on bearings 26. Said lever 27 or first arm extends upwardly, and a spring 28 connected to the upper end of lever 27 attaches to the forward end of frame 18 and forces the contact means 16 against guidance member 13 through pull exerted on arm 24 by rotation about bearings 26. A flexible cable 29 connects lever 27 with the throttle of engine 19, and a second flexible cable 30 connects lever 27 with brake bands 31 on rear wheels 22. A forward movement of lever 27 and rotation of member 38 about bearings 26 exert a pull on brake cable 30 applying braking pressure to rear wheels 22. The same action tends to close the engine throttle, reducing the revolutions per minute and at about the halfway point in said forward movement the centrifugal clutch 20 will disengage, bringing the engine to an idling speed while the driving action is suspended. By attaching the brake control cable 30 to an upper portion of lever 27 above the throttle control cable 29, it will have the longest range of travel with lever 27 (since its fulcrum is fixed about bearing 26 at its lower end) and insures a rapid reduction of speed even if the engine response to the reduced elevation is lagging.

The steering control of vehicle 15 has been illustrated in FIGS. 5, 6, 7, 8 and 9. The front axle 32 is mounted on and extends outwardly beyond chassis 18 and at its outer ends supports a pair of steering knuckles 31 having hinged spindles 33 on which the front wheels 34 are mounted. An arm 35 secured on each of the respective knuckles extends forwardly and at its outer end is in pivotal connection with a tie rod 36 interconnecting said arms. A rod or arm 37 pivotally cooperates with arm 24 adjacent its rear end where it is interconnected with journal members 38 through which bearings 26 extend, and arm 37 remains in a plane which is always the same distance from the plane in which arm 24 is moving, which because of the universal action of member 38 rises or falls with changing elevation of member 13. The pivotal cooperation between member 38 and arm 37 is perhaps best understood by reference to FIG. 8. Note the rear end of rod 37 is attached to the bearing support 26b. Thus when arm 24 causes member 38 to move sidewise about bearings 26a, for example, member 26b and arm 37 move similarly. Arm 37 swings in parallel with arm 24 in the various steering movements. A pair of springs 39 interconnect arm 24 and arm 37 with the arms 35, and the end of the member 37 opposite the member 38 swings free except for the relative restraining action of the springs 39.

A steering column 40 is journalled for rotation in a forward member of chassis 18 and terminates at its upper end adjacent the driver's seat of vehicle 15. A steering wheel 41 having a slip clutch 42 is mounted on the upper end of column 40 and applies limited turning movements to the steering column. A tie rod 43 is connected with an arm 44. Arm 44 is a metal strap having one end wrapped about and fixed to a lower portion of the steering column 40. The opposite end of arm 44 is pivotally attached to an end of tie rod 43. The other end of tie rod 43 is pivotally attached to one of the arms 35. For convenience in illustration, a right hand steering arrangement has been shown, but a left hand arrangement may be provided if desired. Turning movements of column 40 (as for example indicated by the arrows in FIG. 9) direct the movement of arm 44 and thus associated arm 35 and, through tie rod 36, keeps the pair of arms 35 in parallel so that the same amount of turn is applied to the two front wheels.

The springs 39 resist such turning movements and when a predetermined amount of resistance is reached, the slip clutch 42 disengages the steering wheel 41 from control of column 40 and thereafter steering control is initiated through contact means 16 and spring 39 until the resistance reduces to permit clutch 42 to again engage column 40. This arrangement permits automatic steering when the vehicle is not under operator control and also when the operator control exceeds the turning position required by guidance member 13.

Figure 4:
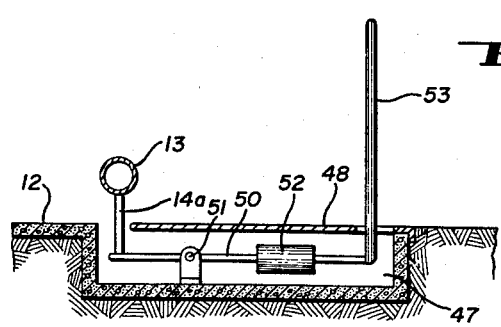
FIG. 4 is a vertical section through the loading and unloading station, taken approximately on the line 4—4, FIG. 1.

The starting and stopping arrangement illustrated in FIGS. 1 and 4 represents a preferred embodiment. The track 12 is recessed for a substantial distance lengthwise as shown at 47 in FIG. 4 and a metallic deck or access panel 48 is mounted over said recess along its length and supports the weight of the vehicle. A lowering of the stretch of guidance member 13 adjoining panel 48 moves lever 27 to stop the vehicle and elevation of member 13 by manual actuation of a lever 53 releases the brake and accelerates the prime mover or engine 19 to start the vehicle. The stretch of guidance member 13 adjoining the deck is supported on a pivotally mounted post 14a, the beam support 50 thereof being fulcrumed as shown at 51 and a counterbalance 52 is provided to substantially balance the downward force exerted by spring 28 on contact means 16. The upright handle 53 attached to beam 50 may be manually moved to elevate the guidance member in starting the vehicle. In case of accidental disengagement of rollers 23 with guidance member 13, arm 24 would drop and brake the vehicle to a stop. This arrangement provides positive stopping without attendant control and thus simplifies the loading and unloading operations.

The drawings illustrate a preferred embodiment of the structural assembly utilized in the practice of my invention. For example, the stopping mechanism 50, 52 and 53 is a counterbalanced, mechanical control but may be an automatic hydraulic system, if preferred. The prime mover of the vehicle may be internal combustion such as shown at 19 (FIG. 5) or it may be a battery-powered electric motor. A gear transmission may be substituted for the chain transmission 21, and a brake control on any of the wheels 22, as shown at 31 in FIG. 5, will provide ample control of the vehicle stopping and starting. Other changes and modifications may be availed of within the spirit and scope of the invention as set forth in the hereunto appended claims.

What is claimed is:

1. A control system for miniature vehicles, comprising an elongated guidance member mounted at varying elevations above a surface over which such a vehicle moves and arranged in a predetermined course, a self-propelled miniature vehicle having means for slidable contact with said guidance member, an assembly for independent steering of said vehicle within a limited range of movement laterally of said guidance member and including means for automatic steering of said vehicle when not independently steered, means for operatively connecting said assembly with said slidable contact means, and an accelerator mechanism on said vehicle in operative connection with said slidable contact means actuated by varying elevation of said guidance member so as to increase or decrease the rate of movement of said vehicle.

2. A control system for miniature vehicles, comprising an elongated guidance member mounted at varying elevations above a surface over which such a vehicle moves and arranged in a predetermined course, a self-propelled miniature vehicle having means for slidable contact with said guidance member, an assembly for independent steering of said vehicle within a limited range of movement laterally of said guidance member and including means for automatic steering of said vehicle when not independently steered, means for operatively connecting said assembly with said slidable contact means, and an accelerator mechanism on said vehicle in operative connection with said slidable contact means actuated by increases in elevation of said guidance member to accelerate the rate of propulsion of said vehicle.

3. A control system for miniature vehicles, comprising an elongated guidance member mounted at varying elevations above a surface over which such a vehicle moves and arranged in a predetermined course, a self-propelled miniature vehicle having means for slidable contact with said guidance member, an assembly for independent steering of said vehicle within a limited range of movement laterally of said guidance member and including means for automatic steering of said vehicle when not independently steered, means for operatively connecting said assembly with said slidable contact means, and an accelerator mechanism of said vehicle in operative connection with said slidable contact means actuated by reduction in elevation of said guidance member to decelerate the rate of propulsion of said vehicle.

4. A control system for miniature vehicles, comprising an elongated guidance member mounted at varying elevations above a surface over which such a vehicle moves and arranged in a predetermined course, a self-propelled miniature vehicle having means for slidable contact with said guidance member, an assembly for independent steering of said vehicle within a limited range of movement laterally of said guidance member and including means for automatic steering of said vehicle when not independently steered, means for operatively connecting said assembly with said slidable contact means, an accelerator mechanism on said vehicle in operative connection with said slidable contact means actuated by varying elevation of said guidance member, and means associated with said guidance member for stopping said vehicle at an established location along said course.

5. A control system for miniature vehicles, comprising an elongated guidance member mounted at varying elevations above a surface over which such a vehicle moves and arranged in a predetermined course, a self-propelled miniature vehicle having means for slidable contact with said guidance member, an assembly for independent steering of said vehicle within a limited range of movement laterally of said guidance member and including means for automatic steering of said vehicle when not independently steered, and a spring-urged member exerting a downward force on said slidable contact means so as to maintain it in engagement with said guidance member throughout its movement around the course, means for operatively connecting said assembly with said slidable contact means, and an accelerator mechanism on said vehicle in operative connection with said slidable contact means actuated by varying elevation of said guidance member so as to increase or decrease the rate of movement of said vehicle.

6. A system as defined in claim 3, in which the reduction in elevation of said guidance member applies braking pressure to the vehicle wheels.

7. In a miniature wheel-supported vehicle having slidable contact means extending forwardly from its front end for engagement with a guidance member extending along the course of travel, a rear drive prime mover for the vehicle, a brake on at least one wheel of the vehicle, a first arm hingedly mounted on said vehicle with its fulcrum adjacent one of its ends, a second arm connecting said contact means with one end of said first arm, and flexible cables mounted on said first arm in connection with the propulsion control of the prime mover and the brakes, whereby changing elevation of the contact means controls the vehicle operation from a stop position to its maximum rate of propulsion.

8. A vehicle as defined in claim 7 in which the brake cable has its connection to the first arm at a greater distance from the fulcrum than the propulsion control cable so as to have a greater degree of response to changed settings than the propulsion control cable.

References Cited in the file of this patent

UNITED STATES PATENTS

| 406,391 | Dibble | July 2, 1889 |
| 1,613,866 | Avery | Jan. 11, 1927 |
| 2,642,815 | Baigent | June 23, 1953 |
| 2,925,875 | Bourdon | Feb. 23, 1960 |

FOREIGN PATENTS

| 540,749 | Italy | Mar. 13, 1956 |